United States Patent
Kent

(10) Patent No.: US 6,671,804 B1
(45) Date of Patent: Dec. 30, 2003

(54) METHOD AND APPARATUS FOR SUPPORTING AUTHORITIES IN A PUBLIC KEY INFRASTRUCTURE

(75) Inventor: Stephen Thomas Kent, Boxborough, MA (US)

(73) Assignee: BBNT Solutions LLC, Cambridge, MA (US)

(*) Notice: Subject to any disclaimer, the term of this patent is extended or adjusted under 35 U.S.C. 154(b) by 175 days.

(21) Appl. No.: 09/591,761

(22) Filed: Jun. 12, 2000

Related U.S. Application Data
(60) Provisional application No. 60/168,301, filed on Dec. 1, 1999.

(51) Int. Cl.[7] .................................................. H04L 9/00
(52) U.S. Cl. ........................ 713/175; 713/156; 713/161
(58) Field of Search .......................... 380/279; 713/156, 713/159, 175, 161; 707/506, 9, 523, 524, 505; 709/246

(56) References Cited

U.S. PATENT DOCUMENTS

| | | | | |
|---|---|---|---|---|
| 4,868,877 A | | 9/1989 | Fischer ........................ 380/25 |
| 5,659,616 A | | 8/1997 | Sudia ........................... 380/23 |
| 5,699,431 A | | 12/1997 | Van Oorschot et al. ........ 380/30 |
| 5,712,914 A | * | 1/1998 | Aucsmith et al. ............. 380/30 |
| 5,978,579 A | * | 11/1999 | Buxton et al. ............... 395/701 |
| 5,982,893 A | * | 11/1999 | Hughes ........................ 705/75 |
| 5,999,628 A | | 12/1999 | Chan ............................ 380/30 |
| 5,999,711 A | | 12/1999 | Misra et al. ........... 395/187.01 |
| 6,134,658 A | * | 10/2000 | Multerer et al. ............ 713/175 |
| 6,135,646 A | * | 10/2000 | Kahn et al. ................. 709/217 |

OTHER PUBLICATIONS

Bruce Schneier. Applied Crytopgraphy, second edition, pp. 34–39, 185–187, Oct. 1996.*
ITU–T Recommendation X.509, Aug. 1997, International Tleecommunications Union.*
Network Working Group, RFC 2632, The Internet Society, Jun. 1999, pp. 1–10.*

* cited by examiner

*Primary Examiner*—Ayaz Sheikh
*Assistant Examiner*—Hosuk Song
(74) *Attorney, Agent, or Firm*—Leonard Charles Suchyta; James K. Weixel

(57) ABSTRACT

In a cryptographic device (140) storing a number of templates (310), a system and method for supporting authentication services is provided. The cryptographic device (140) receives inputs representing a request for authentication services. The cryptographic device (140) then compares the syntax of the input to the syntactic constraints defined in one of the templates (310), where each template (310) includes syntactic constraints associated with at least one authority. When the cryptographic device (140) determines that the syntax of the input is consistent with the template (310), the cryptographic device (140) validates the input.

44 Claims, 6 Drawing Sheets

| TEMPLATE 1 | AUTHORITY(IES) BOUND TO TEMPLATE 1 |
|---|---|
| TEMPLATE 2 | AUTHORITY(IES) BOUND TO TEMPLATE 2 |
| TEMPLATE 3 | AUTHORITY(IES) BOUND TO TEMPLATE 3 |
| TEMPLATE 4 | AUTHORITY(IES) BOUND TO TEMPLATE 4 |
| TEMPLATE 5 | AUTHORITY(IES) BOUND TO TEMPLATE 5 |
| ... | ... |

METHOD AND APPARATUS FOR SUPPORTING AUTHORITIES IN A PUBLIC KEY INFRASTRUCTURE

RELATED APPLICATION

This application claims priority under 35 U.S.C. § 119 based on U.S. Provisional Application No. 60/168,301 filed Dec. 1, 1999, the disclosure of which is incorporated herein by reference.

FIELD OF THE INVENTION

The present invention relates generally to cryptography and, more particularly, to supporting authorities in a public key infrastructure.

BACKGROUND OF THE INVENTION

In distributed environments, such as network systems, a high level of assurance is often required when identifying and authenticating various entities in the system. For example, in networks storing confidential information, access control is typically employed for limiting access to the confidential information to designated parties. Additionally, general authentication services are also typically employed to authenticate users of secure electronic mail (email) systems to ensure that originators and recipients of email messages are actually the parties they claim to be.

Public key cryptography has been commonly used to provide a mechanism to support access control and general authentication services in such distributed environments. Conventional public key cryptography relies upon public key certificates, such as those defined in ITU X.509, to bind a user's public key reliably to his name and provide users with the high level of assurance desired when identifying other entities. Other forms of certificates, called attribute certificates, bind data other than a public key to a user's name, and associate the user's public key through a pointer to the user's public key certificate. A certificate, or a request containing information to be included in a certificate, may be transmitted to an authority, such as a certification authority (CA), a registration authority (RA), or an attribute authority (AA) which verifies the data contained in the certificate or certificate request. After verifying that the certificate is legitimate, the CA digitally "signs" the certificate using the CA's private key. The recipient of a message, signed using the private key corresponding to the public key in the signed certificate, can then verify that the message was actually sent by the originator named in the message, provided that the recipient verifies the signature on the message and verifies the CA's digital signature on the certificate using the CA's public key.

In conventional systems, the responsibility for signing a certificate is borne by an application executing on a general-purpose computer, under the control of a general-purpose operating system. For example, a conventional CA may use a conventional computer connected to a network, such as the Internet, to check certificate requests and sign certificates. Such systems are subject to a wide range of security attacks, including physical, procedural and software security attacks.

Cryptographic modules have been employed to lessen the risks of these types of security attacks. Such cryptographic modules may be connected to an authority's workstation, such as a particular CA's workstation, and may be used to sign a certificate on behalf of the CA. The CA's private key is typically stored in the cryptographic module and the cryptographic module uses this key to sign the certificate or, more commonly, a hash of the certificate. The cryptographic module may also perform some simple checks to verify the data contained in the certificate before signing it. For example, the cryptographic module may check whether the issuer's name in the certificate matches the configured name of the CA that is supposed to sign the certificate. The cryptographic module may also check whether the authority is authorized to issue public key certificates, versus attribute certificates or certificate revocation lists (CRLs).

A problem with such conventional systems is that the authority's workstation typically performs most if not all of the processing associated with determining whether a certificate/request or CRL/request is valid. For example, the CA workstation typically determines whether a cryptographically protected certificate/request was generated by the party in question. The CA workstation then strips off the digital signature transmitted with the certificate/request and sends the stripped certificate/request to the cryptographic module for signing. In this manner, the cryptographic module relies upon the CA to determine whether the certificate is legitimate and the cryptographic module performs no checking, or only minimal checking, before signing the certificate on behalf of the CA. As described previously, the CA, or any other authority's workstation, may be vulnerable to various types of security attacks. Therefore, having the CA perform much of the checking associated with the certificate may lessen the overall security of the system.

Another drawback with conventional cryptographic modules is that, if they perform any checks at all, the checks are essentially the same rudimentary syntactic checks for all certificates, i.e., the modules generally are unable to perform different syntactic checks for different CAs. Additionally, in environments where multiple registration authorities (RAs) may communicate with a single CA, conventional cryptographic modules are unable to perform different syntactic checks for the various RAs on a per-RA basis.

A further problem with conventional cryptographic modules is that they typically include no audit trail. That is, conventional cryptographic modules do not record enough information to enable an audit authority to fully determine the actions performed by the module.

As a result, there exists a need for a cryptographic device that overcomes the problems of conventional cryptographic modules, when used to support CAs, RAs, or AAs.

SUMMARY OF THE INVENTION

Systems and methods consistent with the present invention address this and other needs by providing a cryptographic module that supports multiple authorities in a public key infrastructure. The cryptographic module includes multiple customized templates based on the requirements of the particular trusted authorities. The cryptographic module syntactically checks each of the inputs against one of the templates to validate the input. The cryptographic module also stores a complete audit trail that enables an audit authority to later determine the actions performed by the cryptographic module.

In accordance with the purpose of the invention as embodied and broadly described herein, a method for validating the status of an input in a cryptographic device is provided. The cryptographic device stores one or more templates. Each template includes syntactic constraints associated with at least one authority. The method includes receiving an input representing a request for certificate/CRL generation and comparing the syntax of the input to syntactic constraints defined in one of the templates. The method also includes determining whether the syntax of the input is consistent with the template and validating the input when the syntax is consistent with the template.

In another aspect of the present invention, a cryptographic module is provided. The cryptographic module comprises a memory configured to store a plurality of templates. Each template includes syntactic constraints associated with at least one authority. The cryptographic module also includes a processor configured to receive an input representing a request for certificate/CRL generation services and compare the syntax of the input to syntactic constraints defined in one of the templates. The processor is also configured to determine whether the syntax of the input is consistent with the template and validate the input when the syntax is consistent with the template.

In still another aspect of the present invention, a computer-readable medium, having sequences of instructions stored thereon is provided. The instructions include sequences of instructions which, when executed by a processor, cause the processor to receive an input representing a request for authentication services and compare the syntax of the input to syntactic constraints defined in one of multiple templates. Each template includes syntactic constraints associated with at least one authority. The instructions also cause the processor to determine whether the syntax of the input is consistent with the template and validate the input when the syntax is consistent with the template.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

FIG. 3 illustrates an exemplary rules database consistent with the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Methods and systems consistent with the present invention provide authentication services for a number of authorities in a public key infrastructure. A cryptographic module receives an input specifying an authority under which the input is to be signed. The cryptographic module checks the syntax of the input against a template for that particular authority. When the syntax matches the requirements for that authority and the authority is enabled for signing, the cryptographic module signs the input.

EXEMPLARY SYSTEM CONFIGURATION

Figure 1:
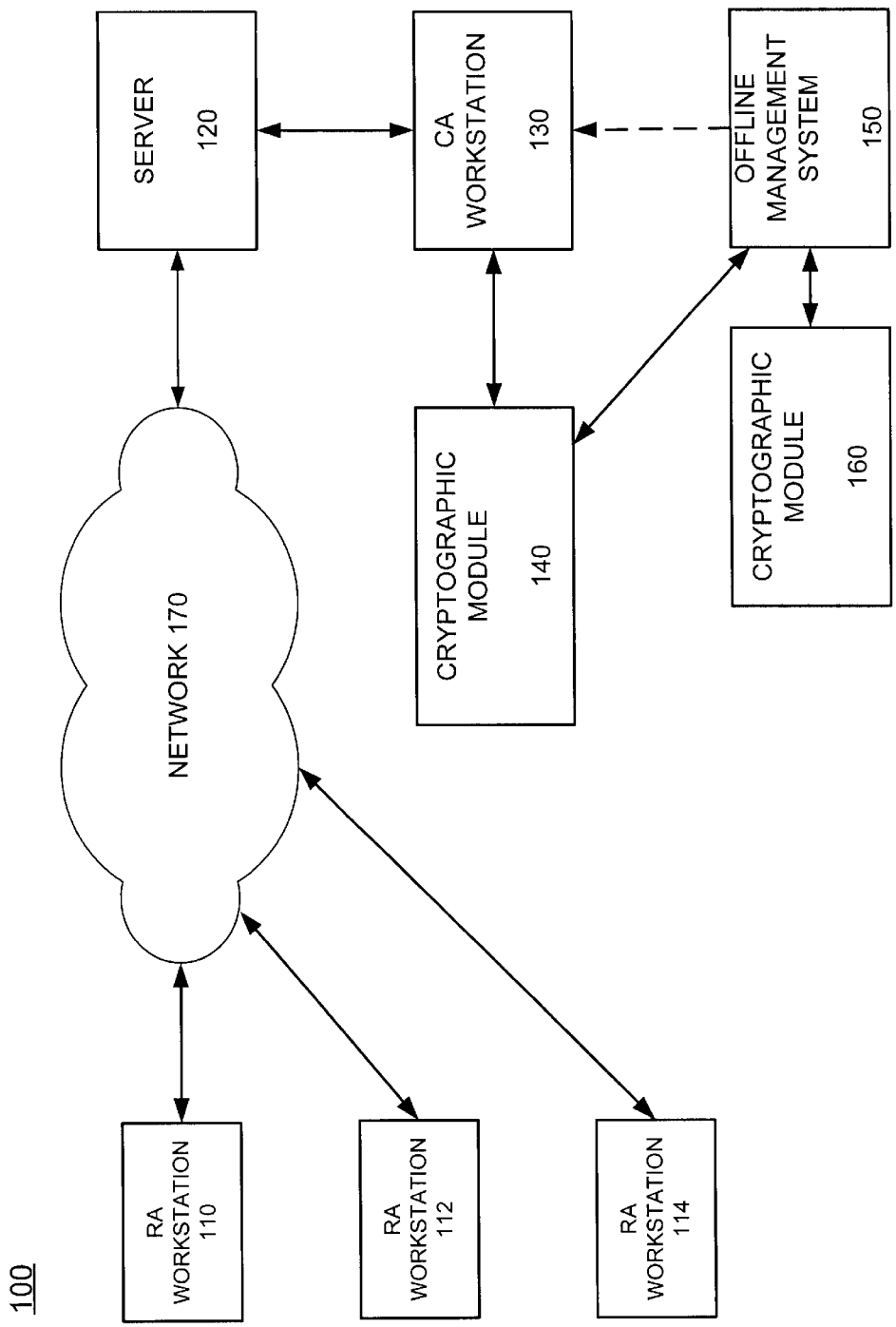
FIG. 1 is a block diagram of an exemplary system in which an implementation consistent with the present invention may be employed.

FIG. 1 is a diagram of an exemplary system 100 in which an implementation consistent with the present invention may be employed. The system 100 includes registration authority (RA) workstations 110, 112, 114, server 120, certification authority (CA) workstation 130, cryptographic module (CM) 140, offline management system (OMS) 150, CM 160 and network 170.

The RA workstations 110, 112 and 114 may each include any type of computer system, such as a personal computer or a laptop, with a connection to network 170. In an exemplary implementation of the present invention, the RA workstations 110, 112 and 114 receive inputs from users, generate certificates and transmit the certificates to CA workstation 130 over network 170 via a wired, wireless, or optical connection. The network 170 may include the Internet, a local area network (LAN), wide area network (WAN), intranet or another type of network. Only three RA workstations are shown for simplicity. It should be understood, however, that additional RA workstations may be included in system 100, as described in more detail below. A system may also integrate RA functions with the CA workstation 130, so that no distinct RA workstations may be present.

Server 120 may include any type of computer system that provides a connection to network 170 to enable server 120 to communicate with RA workstations 110, 112 and 114 and CA workstation 130.

CA workstation 130 may be any type of computer system, such as a mainframe computer, minicomputer or a personal computer. The CA workstation 130 receives certificates, certificate requests or CRL requests from an RA workstation, or directly from a user by other means. The CA workstation 130, as described in more detail below, may examine the particular request to determine whether the request came from the RA in question. The CA workstation 130 then forwards the request to CM 140 for further processing.

The CM 140 receives inputs from CA workstation 130, such as a certificate/request or CRL/request, and syntactically compares the input to a particular set of rules to determine whether the certificate is valid. If the certificate is valid, CM 140 digitally signs the input using CA's 130 private key and returns the digitally signed certificate. CM 140 may also receive inputs from other CAs, in addition to inputs from attribute authorities (AAs), or certificate revocation authorities. In each situation, the CM 140 returns a response appropriate to the particular input, e.g., a signed public key or attribute certificate, a signed certificate revocation list (CRL), etc.

OMS 150 may include any type of conventional computer system, such as a personal computer or a laptop, that may be used to load information to CA workstation 130. As described in more detail below, the OMS 150 facilitates the generation of rules templates that may then be loaded onto CA workstation 130.

CM 160, consistent with the present invention, may include any type of conventional cryptographic module that may be used to digitally sign the templates generated by OMS 150. Signing these templates ensures that they may not be undetectably tampered with at a later time.

EXEMPLARY CRYPTOGRAPHIC MODULE

Figure 2:
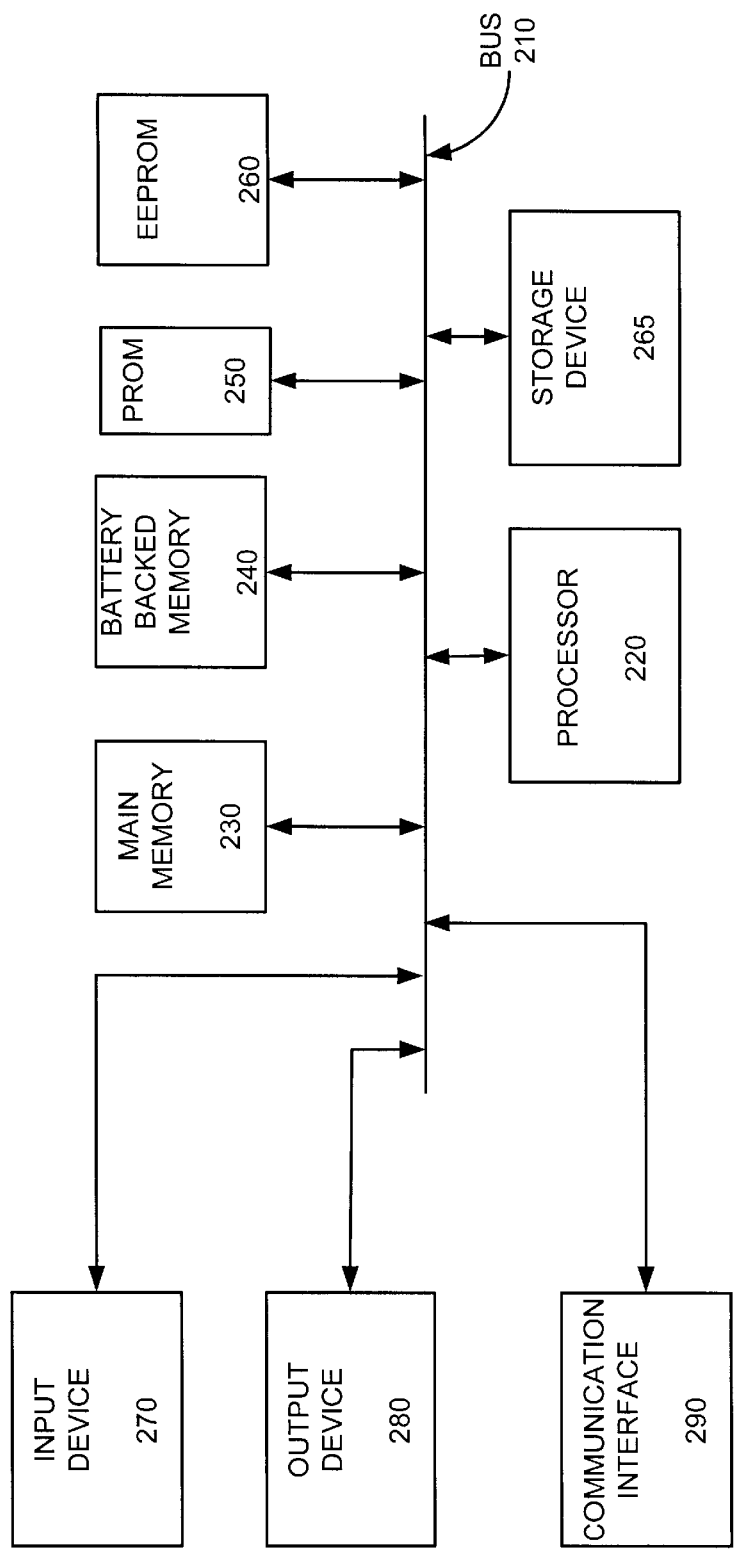
FIG. 2 is a block diagram of the cryptographic module of FIG. 1 consistent with the present invention.

FIG. 2 is a block diagram of CM 140 of FIG. 1 with which methods and systems consistent with the present invention may be implemented. CM 140 includes a bus 210, a processor 220, a main memory 230, a tamper detect memory to hold data to be erased in the event that tampering is detected (e.g., a battery-backed memory) 240, a non volatile, read-only memory for permanent code storage (e.g., programmable read only memory (PROM)) 250, a non-volatile, writeable memory for data and updateable code (e.g., an electrically-erasable read only memory (EEPROM) or flash RAM) 260, a non-volatile writeable memory or other storage medium for audit 265, an input device 270, an output device 280, and a communication interface 290. The bus 210 permits communication among the components of the CM 140.

The processor 220 may include any type of conventional processor or microprocessor that interprets and executes instructions. The memory 230 may include a RAM or another dynamic storage device (referred to as main memory) that stores information and instructions for execution by the processor 220 and/or a ROM or another type of static storage device that stores static information and instructions for use by the processor 220. Main memory 230 also may store temporary variables or other intermediate information used during execution of instructions by processor 220.

Tamper detect memory 240 may include a RAM or another dynamic storage device (referred to as BBRAM) that stores security sensitive information. According to an implementation consistent with the present invention, BBRAM 140 stores a secret symmetric encryption (e.g., DES or 3DES) key associated with CM 140 and a private key associated with the currently active issuing authority. The terms "private key" and "public key" refer to the private and public components of any asymmetric cryptoalgorithm, (e.g., an RSA algorithm key pair) and the term "secret key" refers to a key in a symmetric cryptosystem, (e.g., DES).

The non-volatile read-only memory 250 may store a public key of an entity that is authorized to sign code to be download into the CM 140, e.g., CM 160.

The non-volatile writeable memory 260 may store the private keys of all authorities that may be supported by CM 140, each encrypted with that authority's secret key. It should be noted that CM 140 may be used to support multiple issuing authorities, such as CA workstation 130 and RA workstations 110, 112 and 114. The storage device 265 may include any conventional non-volatile storage device, such as a magnetic disk, for recording an audit trail of operations performed by CM 140.

The input device 270 consistent with the present invention includes an interface for accepting crypto-ignition keys (CIKs). A CIK is a physical token that stores an encrypted cryptographic key, and also may store user and authority identification data, and integrity information, and may be inserted into input device 270. According to an exemplary implementation, a symmetric key associated with each authority, and which may used to protect the authority's private key, may be encrypted with CM 140's symmetric key and then stored on the CIK. The CIK then provides control of CM 140's signing capabilities by requiring that a CIK(s) for a particular authority be inserted in CM 140. If multiple CIKs are required, they may be inserted serially, over time. When CM 140 receives a request to activate that particular authority, the contents of the CIK may then be decrypted and used to decrypt the authority's private key. If the CIK is removed, CM 140 de-activates the current authority.

Additional protection may optionally be added by splitting an authority's encrypted secret key among several CIKs using a conventional secret-sharing algorithm. In this manner, an authority can be activated when two-out-of-three, three-out-of-five, or any other combination of CIKs associated with a particular authority are inserted in any order in input device 270.

Each CIK may also include an encoded user identifier (ID) associated with a particular party to whom the CIK is issued. In this manner, CM 140 may determine which CIK or which combination of CIKs in a split-key system were inserted in input device 270 to activate the particular authority. CM 140 stores this information in the audit trail memory, as described in more detail below. Advantageously, including an ID on each CIK enables CM 140 to provide a more complete audit trail of operations.

Each CIK also may include a value, that is bound to the rest of the CIK data by a cryptographic integrity check, which changes each time the CIK is inserted into input device 270. CM 140 stores the value that was last recorded on the CIK, to ensure that an inserted CIK is not an illegitimate copy. Advantageously, inclusion of this time varying value permits CM 140 to detect unauthorized copying and use of a CIK. Moreover, the CIK maintains a distinct copy of this value for each CM 140 with which the CIK may be employed, to permit the use of a single CIK with multiple instances of CMs.

The output device 280 may include any conventional mechanism that outputs information to users, such as status LEDs or an LCD display. According to an exemplary implementation consistent with the present invention, when a CIK is inserted into input device 270 in a split-key system, the CM 140 may utilize the status indicator/display to indicate that it is ready to receive another CIK in activating that authority. Additionally, the status indicator/display may indicate that the system is active/inactive.

The communication interface 290 may include any mechanism that enables the CM 140 to communicate with other devices and/or systems, such as CA workstation 130. For example, the communication interface 290 may include an RS-232 interface, a Small Computer Serial Interface (SCSI) or Universal Serial Bus (USB) for communicating with CA workstation 130.

Execution of the sequences of instructions contained in memory 230 causes processor 220 to perform the process steps that will be described later. In alternative embodiments, hard-wired circuitry may be used in place of or in combination with software instructions to perform the process steps. Thus, the present invention is not limited to any specific combination of hardware circuitry and software.

The CM 140 receives inputs and provides reliable signature services associated with the inputs. According to an exemplary implementation consistent with the present invention, CM 140 stores a number of templates associated with various authorities in a public key infrastructure. These templates may be stored in a rules database (RDB) on CM 140.

EXEMPLARY RULES DATABASE

FIG. 3 illustrates the structure of RDB 300 consistent with the present invention. According to an exemplary implementation, RDB 300 may be stored on non-volatile, writeable memory 260. Alternatively, the RDB 300 may be stored on another memory device accessible to processor 220, such as main memory 230. The RDB 300 is composed of a set of entries, each of which consists of a template field 310 and an authority/authorities field 320.

The template field 310 identifies the specific syntactic constraints established for a particular authority in a public key infrastructure, such as system 100 (FIG. 1). For example, the template 310 for a particular authority may include information identifying which fields in an X.509 public key certificate must be present. The fields in a public key certificate include a version number, serial number, issuer name, validity period, subject name, public subject key information, issuer unique identifier and subject unique identifier.

According to an exemplary implementation, the template field 310 may also include extension field information, such as extensions according to X.509 Version 3 and X.509 Version 2 for CRLs. The extension fields in an X.509 public key certificate include authority and subject key identifiers, key usage restriction, certificate policies, policy mapping, issuer and subject alternate names, etc.

Each template 310 may specify for each field, including extension fields, (or subfield) in an X.509 public key or attribute certificate (or in a CRL) what optional fields (or subfields) must be present, which fields (or subfields) must not be present, and which fields (or subfields) may optionally be present. For each field (or subfield) that must or may be present, and for all fields (and sub-fields) that are required by the certificate or query request format, the template 310 specifies values or value ranges that are allowed. For fields (or subfields) that are logically related to one another, the template 310 specifies any relationships that must hold between the fields (and subfields).

For example, the subject field of an X.509 public key certificate can be required to be subordinate to the issuer field. Subordinate means that the subject's distinguished name begins with the entire issuer's name, followed by some distinguishing part. For example, the name "Country=US, Organization=Ajax Corporation, Organizational Unit= Widget Division" is subordinate to the name "Country=US, Organization=Ajax Corporation."

According to an implementation consistent with the present invention, CM 140 may support multiple authorities and it binds each template in field 310 to a specified authority or set of authorities in corresponding field 320. A single CA or attribute authority (AA) may also be represented by multiple RAs. In this case, a template in field 310 may be defined to be specific to an individual RA or may be defined to apply to a set of RAs in corresponding field 320. Advantageously, this enables the CM 140 to express syntactic constraints very precisely on a per-RA basis.

For example, a CA representing a corporation might by supported by RAs on a per-division or per-department basis. Each RA may be constrained, through the use of per-RA templates, to issue certificates to only those individuals who are within the division or department in question, and with privileges that are appropriate to that corporate unit.

Additionally, including extension fields in a template 310 enables CM 140 to flexibly support changes that may occur in a system. For example, suppose a new software application was deployed by a person in a corporation. A specific RA may be designated to issue certificates to constrain the use of the new application. In this case, a new extension in an X.509 certificate specific to the new application may be created and stored in a template 310 to identify this particular RA as the point of contact for issuing the certificates required to use this new application.

The templates stored in RDB 300 are used by CM 140 to perform the desired authentication service, based on the particular input. These templates are generated under the direction of a template authority to ensure their integrity and authenticity, as described in more detail below.

EXEMPLARY PROCESSING FOR GENERATING AND STORING TEMPLATES

Referring to FIG. 1, OMS 150 and CM 160 generate and store various authority templates in an implementation consistent with the present invention. OMS 150 executes a template generation application that facilitates the entering and storing of template information. The details of the programming required to implement the template generation application are not disclosed herein as such programming steps can be determined by one of ordinary skill in the art from the functions described herein.

Figure 4:
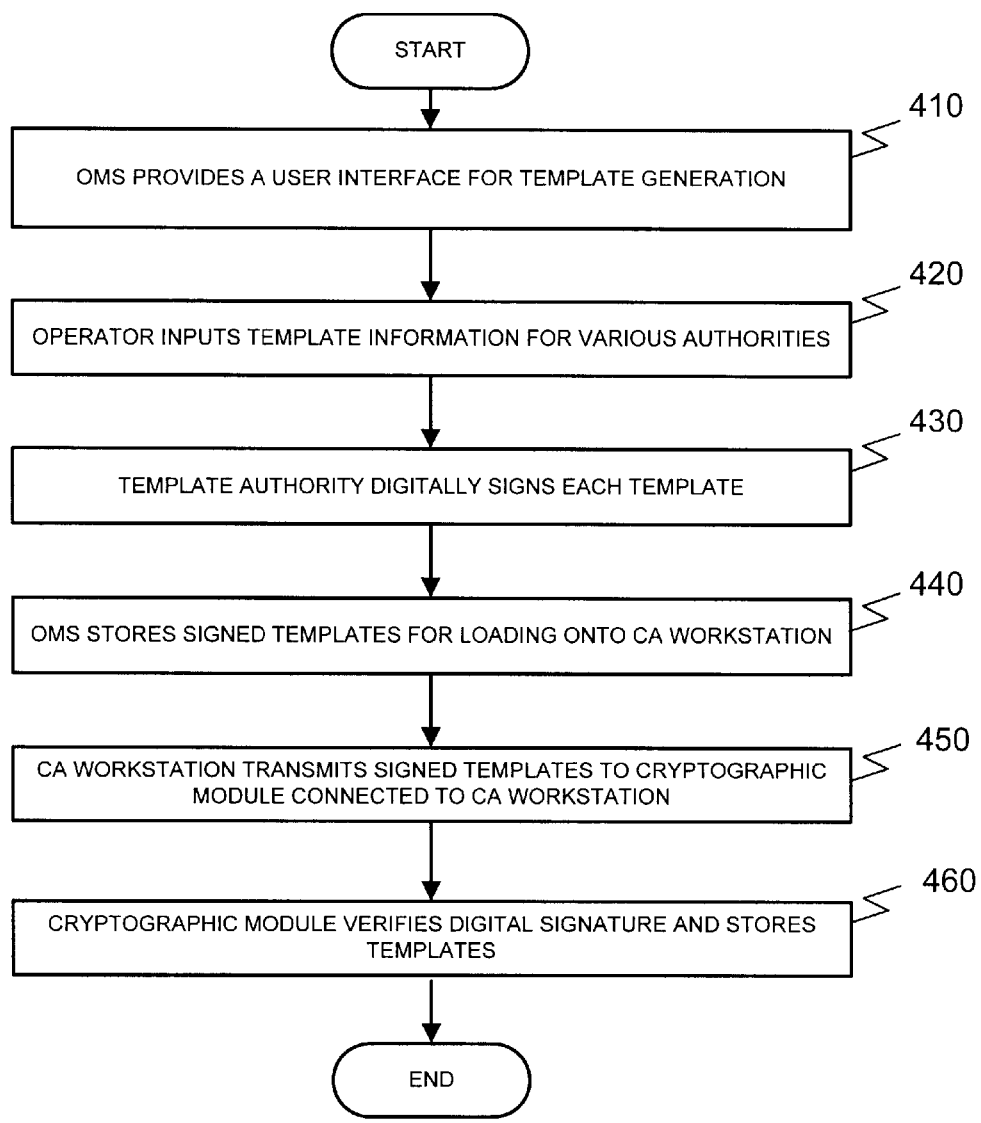
FIG. 4 is a flowchart of processing for generating and storing templates in a manner consistent with the present invention.

FIG. 4 is a flowchart illustrating exemplary processing for generating and storing templates in a manner consistent with the present invention. The OMS 150 provides a user interface to an operator (step 410). According to an implementation consistent with the present invention, the user interface may be a user-friendly graphical user interface (GUI) displayed on a monitor connected to OMS 150 that facilitates entering templates into OMS 150. The operator, via the GUI, may then generate templates for all the authorities that may be supported by CM 140 (step 420).

For example, CA workstation 130 (FIG. 1) may provide certificate issuing services for RA workstations 110, 112 and 114. In this scenario, the operator may enter separate templates for each of RAs 110, 112 and 114 with the name of the RA and a hash of its public key included as part of a per-RA template. The operator may also specify for each field, including extension fields, (or subfield) in an X.509 certificate (or in a certificate status query) what optional fields (or subfields) must be present, which fields (or subfields) must not be present, and which fields (or subfields) may optionally be present. For each field (or subfield) that must or may be present, and for all fields (and sub-fields) that are required by the certificate or query request format, the template specifies values or value ranges that are allowed. For fields (or subfields) that are logically related to one another, the template specifies any relationships that must hold between the fields (and subfields). A template also may specify that a value for a field or extension (or subfield) may be inserted into a certificate or CRL, possibly overriding values supplied by a user, RA or CA, to force a signed certificate to be consistent with the syntactic policy expressed in the template.

After the templates have been generated, a template authority hosted on CM 160 signs each template to ensure that the templates cannot be undetectably tampered with at a later time (step 430). According to an exemplary implementation, CM 160 may include a similar configuration to CM 140 (FIG. 2). In such an implementation, the designated template authority must first enter his/her CIK into CM 160 before CM 160 may sign the templates. Alternatively, a split-key system may also be employed. It should be noted that when a template authority is created, its public key may be exported by the CM 160 directly onto a device which is later imported directly into the CM 140 that is used for certificate or CRL signing. In this manner, the public keys needed to validate each template by CM 140 are not subject to mediation by any other device.

The OMS 150 then stores the signed templates in RDB 300 on a computer-readable medium, such as a floppy disk, zip disk or CD-ROM, for loading onto CA workstation 130 as indicated by the dashed line in FIG. 1 (step 440). Alternatively, OMS 150 may store signed templates in RDB 300 on a medium suitable for direct loading into CM 140. Such media may include a PC memory card or analogous storage devices. According to an exemplary implementation, OMS 150 is isolated from network 170 and is dedicated to template generation/management to ensure the integrity of the template generation process.

After the templates in RDB 300 are loaded onto CA workstation 130, CA workstation 130 transmits the signed templates to cryptographic module 160 for storage (step 450). In implementations consistent with the present invention, CA workstation 130 may also store some or all of the templates in RDB 300 until needed by CM 160. In this manner, additional templates may be stored in memory on CA workstation 130, thereby lessening the need for additional memory by CM 140. Alternatively, templates in RDB 300 may be directly loaded into CM 140, and communicated to CA workstation 130.

After receiving the signed templates in RDB 300, CM 140 verifies the signature of the template authority using the public key associated with the template authority (step 460). As described previously, the public key needed to validate each template may be entered via a direct I/O path not subject to mediation by any other device, and under control of an authority on CM 140. If the templates have been tampered with, CM 140 detects the tampering and rejects the templates. The procedure described above for generating and storing templates in RDB 300 ensures the integrity and authenticity of the templates. After the templates are stored in RDB 300, CM 140 may proceed to perform authentication services for a number of authorities.

EXEMPLARY PROCESSING FOR PROVIDING AUTHENTICATION SERVICES

Figure 5:
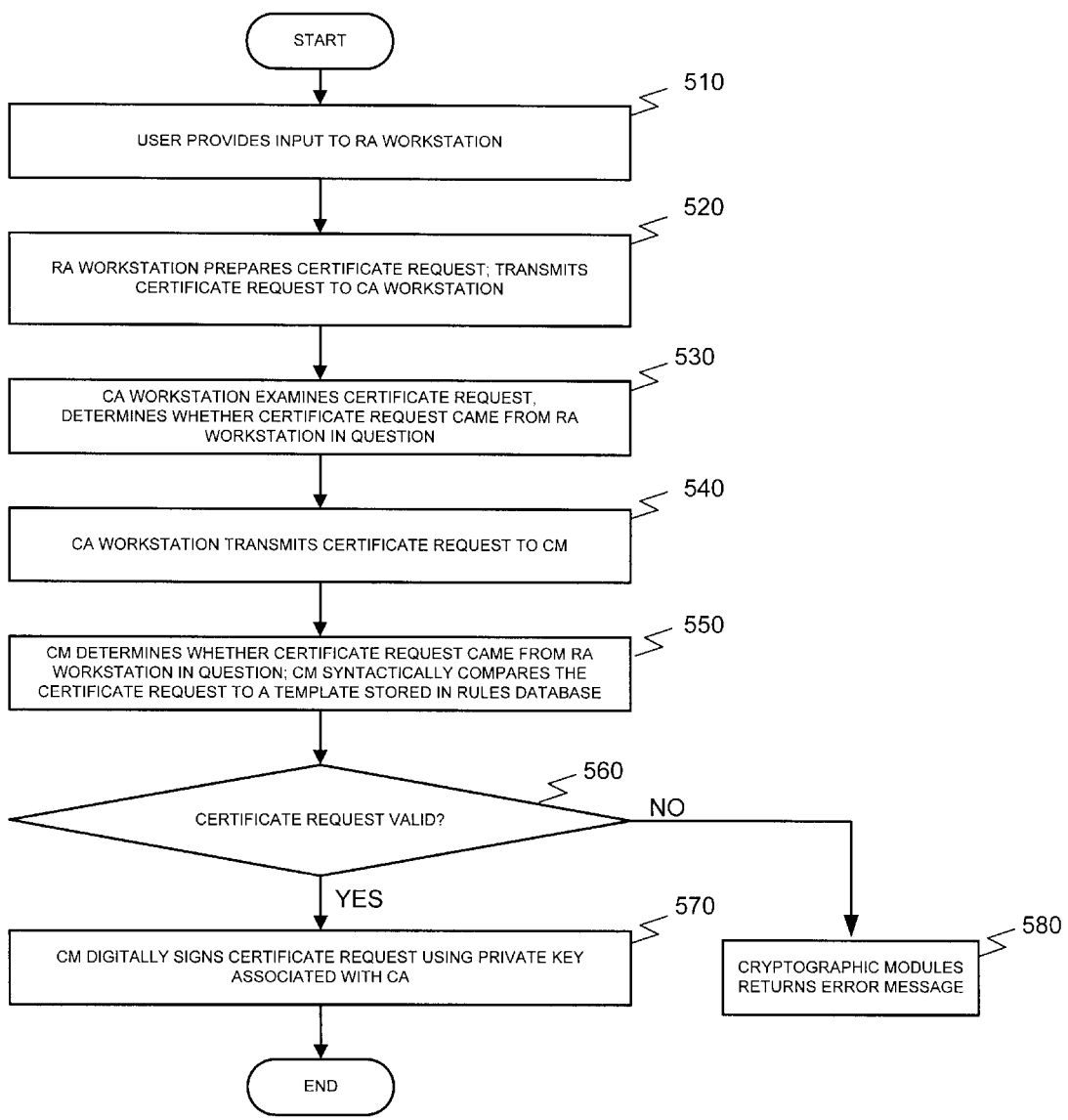
FIG. 5 is a flowchart of processing for providing authentication services in a manner consistent with the present invention.

FIG. 5 illustrates processing associated with providing certificate services in a public key infrastructure consistent with the present invention. Assume that a user wishes to be registered in a system. Registration authorities (RAs) are conventionally used to identify users and bind them to keying material that will be associated with them later within the system. The user provides his public key, and may provide other certificate data, to an RA workstation, such as RA workstation 110 in FIG. 1 (step 510). If the user is requesting an attribute certificate, the user may submit data for incorporation into such a certificate, and may sign the data using his private signature key, to bind the attributes to his identity. The RA workstation 110 may then prepare a certificate request by binding the user's public key, along with other information, such as a user ID, to a certificate (step 520). The RA workstation 110 may use any standard protocol for generating a certificate request, such as the certificate management protocol (CMP). The RA workstation 110 may also cryptographically protect the certificate request by digitally signing the request using the RA's 110 private key. The RA workstation 110 then transmits the certificate to CA workstation 130 via network 170.

A user may also interact with an RA via some locally specified means to request revocation of a previously issued certificate. The RA workstation 110 would then transmit a revocation request to the CA workstation 130, in an authenticated form, e.g., digitally signed. Alternatively, the user may transmit a certificate or a revocation request directly to a CA, bypassing an RA.

CA workstation 130 receives and examines the certificate request (step 530). The CA workstation 130 then verifies that the request came from RA workstation 110 by using the public key associated with RA workstation 110. The CA workstation 130 may access a directory to determine the public key associated with RA workstation 110, or the RA's public key may be communicated in a certificate or via other means. Once the CA workstation 110 verifies the identity of the RA requesting authentication services, the CA workstation 130 transmits the certificate request to CM 140 (step 540). In this manner, CA workstation 130 may act as a preliminary filter. That is, if the CA workstation 130 determines that the certificate did not come from RA workstation 110, the CA workstation 130 returns an error message. In alternative implementations, step 530 may be bypassed.

CM 140 receives the certificate request and determines whether the certificate request actually came from RA workstation 110 (step 550). To verify the authenticity and integrity of the communication from RA workstation 110, CM 140 must receive the public key of RA workstation 110. According to implementations consistent with the present invention, CM 140 may receive the public keys via conventional public key certificate mechanisms. Ancillary control, however, must be employed to ensure that the RA certificates are properly identified. For example, the name of the RA and a hash of its public key can be included as part of a per-RA template. Alternatively, direct entry of the RA's public key into CM 140 can be effected in a similar manner as described above for entry of the template authority public key.

CM 140, after verifying that the certificate request came from RA workstation 110, syntactically compares the certificate request to the particular template associated with RA 110 stored in RDB 300 (step 550). That is, the CM 140 checks whether the fields/subfields present in the certificate/revocation request transmitted by RA workstation 110 match the constraints defined in template field 310 for RA workstation 110. As discussed previously, the certificate/revocation request may also include any extension fields in accordance with X.509 V.3, or extension fields in accordance with X.509 V.2 for CRLs, or private extensions created for certificates or CRLs. In situations where the template field 310 for RA workstation 110 includes syntactic constraints relating to the extensions, CM 140 checks the received certificate/revocation request against the template information for the extensions as well.

If the request is valid, the CM 140 digitally signs the certificate or CRL on behalf of CA workstation 130 using the private key associated with the appropriate CA (step 570). It should be noted that multiple CAs may be represented by the CA workstation 130. If the request is not valid, the CM 140 returns an error message (step 580).

In the scenario described above in relation to FIG. 5, CM 140 performs all security-critical processing associated with validating a certificate/revocation request from an RA workstation 110. In this fashion, CM 140 detects any tampering with a certificate/revocation request, even from CA workstation 130, and rejects the request when appropriate. Lower layer protocols used to support transport of certificates and responses, or certificate status queries and responses, may be provided outside of CM 140, for example on CA workstation 130, as they are not security critical.

Additionally, in the scenario described above, the RA workstation 110 was described as transmitting a request for a conventional X.509 public key certificate to CM 140. In alternative implementations consistent with the present invention, CM 140 may support signing services for one or more attribute authorities, certificate revocation authorities, etc. In these situations, the CM 140 receives as inputs attribute certificates and certificate revocation lists (CRLs) and/or revocation requests. The CM 140, consistent with the present invention, checks the syntax of the particular input against the appropriate template in RDB 300. When the syntax is consistent with the template, CM 140 returns a digitally signed response appropriate to the input, e.g., a signed attribute certificate, a signed CRL, etc.

As described above, CM 140 supports security-critical signing services for a number of authorities in a public key infrastructure. Therefore, it is important for CM 140 to include an audit trail for security-critical operations it performs. These audit trail records may, among other things, provide records for damage control and deter possible misuse by human operators. Storing the audit trail on CM 140, as opposed to a general-purpose computer such as CA workstation 110, also provides superior security for the audit trail.

EXEMPLARY PROCESSING FOR MAINTAINING AN AUDIT TRAIL

Figure 6:
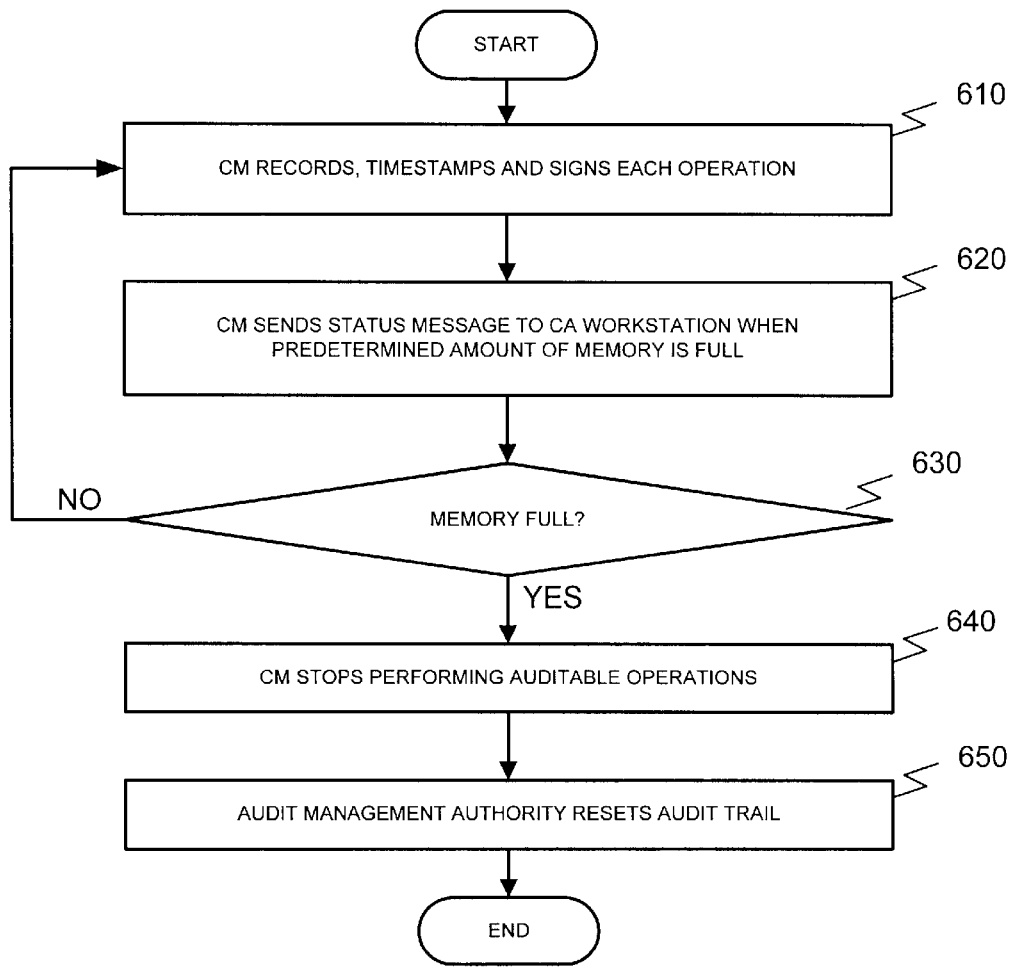
FIG. 6 is a flowchart of processing for providing an audit trail in a manner consistent with the present invention.

FIG. 6 illustrates exemplary processing for maintaining an audit trail of operations performed by CM 140. CM 140, consistent with the present invention, records each operation it performs in a non-volatile memory, such as storage device 265 (FIG. 2) (step 610). These operations include security-critical operations such as signing certificates, signing CRLs, etc. CM 140 also stores the user ID associated with the CIK(s) inserted into CM 140 to activate that particular authority. This information enables an audit authority to determine which party(ies) activated the CM 140 on behalf of an authority.

According to an exemplary implementation, CM 140 also time and date stamps each audit trail entry using an internal time and date clock. The clock maintains the time and date based on universal time coordinated (UTC). A designated time authority may adjust the internal time and date clock by recording corrections to the time as offsets to the UTC time base. In implementations consistent with the present invention, the time authority is distinct from the other authorities discussed previously. Advantageously, this provides the various authorities with clear and distinct responsibilities. Prior to outputting the entries in an audit trail, for external analysis and archive, CM 140 constructs a header that contains a serial number and time stamp, and then digitally signs this header and the audit trail contents using its private key to ensure that the audit trail data cannot be undetectably tampered with (step 610). This header, including the signature of the previously output audit trail, becomes an entry in the new audit trail, to further link successively output audit trails.

CM 140 also includes a mechanism to ensure that the audit trail memory is able to store all the auditable entries and does not overflow. When the audit trail memory is filled to a certain level, CM 140 sends a status message to CA workstation 130, or the authority workstation connected to CM 140 at the time, that the memory is getting full and will soon need to be emptied (step 620). The particular level may be programmable. If an audit trail management authority does not copy the contents of the audit trail memory to another device and clear the memory at this time, the CM 140 continues to write to the audit trail memory. If the audit trail memory becomes full, exclusive of space reserved to hold the records of audit trail signing and output, however, (step 630), the CM 140 stops performing auditable operations (step 640). In this manner, CM 140 ensures that an audit trail management authority will come to empty the audit trail memory and reset the audit trail memory (step 650).

Systems and methods consistent with the present invention enable CM 140 to receive inputs from various authorities, check the syntax of the inputs and provide digitally signed outputs. An advantage of the invention is that customized templates may be stored in RDB 300 on a per-authority basis, such as a per-CA basis and a per-RA basis. Another advantage of the present invention is that the CM 140 performs all syntactic checks, including checking extensions of X.509 certificates and CRLs. A further advantage of the present invention is that CM 140 stores a complete audit trail of security-critical operations performed by the module. This may enable CM 140 to prevent misuse by human operators and supports damage control in case records may be lost.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the present invention may also be used to digitally sign other things, such as electronic checks (e-checks). In this case, the templates stored in the cryptographic module 140 would contain other information, such as specific dollar limits or ranges of dollar limits for the e-checks.

What is claimed is:

1. In a cryptographic device storing a plurality of templates, each template expressing syntactic constraints associated with at least one authority, a method for checking input syntax, comprising:

receiving an input representing a request for authentication service, the input comprising at least one of a cryptographically protected certificate and a cryptographically protected certificate request from a first registration authority;

identifying a template associated with the first registration authority;

comparing syntax of the input to syntactic constraints defined in the identified template; and determining whether the syntax of the input is consistent with the template.

2. The method of claim 1, further comprising:

validating the input when the syntax is consistent with the template; and digitally signing the input when the syntax is consistent with the template.

3. The method of claim 2, wherein the input is validated at least in part by:

using at least one of a public key certificate or certificate request, an attribute certificate or certificate request, and a certificate revocation list (CRL) or revocation request.

4. The method of claim 1, further comprising:

determining whether the input came from the first registration authority by using a public key associated with the first registration authority to verify the authenticity and integrity of the request.

5. The method of claim 1, further comprising:

digitally signing the input with a private key associated with a certification authority when the syntax is consistent with the template; and outputting an error message when the syntax is not consistent with the template.

6. The method of claim 1, wherein the input comprises an X.509 public key certificate including at least one certificate extension, the determining step including:

determining whether the syntax of the at least one certificate extension is consistent with the syntactic constraints defined for the extension in the template.

7. The method of claim 1, further comprising:

storing operations performed by the cryptographic device as a set of entries in a non-volatile memory; and time-stamping each of the entries.

8. The method of claims further comprising:

digitally signing the set of entries in the non-volatile memory with a key associated with the cryptographic device prior to output of the entries, wherein the set of entries includes a signed entry associated with a previous set of entries.

9. The method of claim 8, further comprising:

outputting an indicator when a predetermined portion of the non-volatile memory is full.

10. The method of claim 7, further comprising:

prohibiting execution of auditable events when the non-volatile memory is full.

11. A cryptographic module, comprising:

a memory configured to store a plurality of templates, each template including syntactic constraints associated with at least one authority; and a processor configured to:
 receive an input representing a request for authentication services, the input comprising a cryptographically protected certificate or certificate request from a first registration authority,
 identify a template associated with the first registration authority,
 compare the syntax of the input to syntactic constraints defined in the identified template,
 determine whether the syntax of the input is consistent with the template, and
 validate the input when the syntax is consistent with the template.

12. The cryptographic module of claim 11, wherein the processor is further configured to:

digitally sign the input when the syntax is consistent with the template; and output an error message when the syntax is not consistent with the template.

13. The cryptographic module of claim 12, wherein the input includes at least one of a public key certificate or certificate request, an attribute certificate or certificate request and a certificate revocation list (CRL) or revocation request.

14. The cryptographic module of claim 11, wherein the processor is further configured to:

determine whether the input came from the first registration authority by using a public key associated with the first registration authority.

15. The cryptographic module of claim 11, wherein the processor is further configured to:

digitally sign the input with a private key associated with a certification authority when the syntax is consistent with the template.

16. The cryptographic module of claim 11, wherein the input comprises an X.509 public key certificate including at least one certificate extension, the processor further configured to:

determine whether the syntax of the at least one certificate extension is consistent with the syntactic constraints defined for the extension in the template.

17. The cryptographic module of claim 11, further comprising:

a non-volatile memory, wherein the processor is further configured to:
 store operations performed by the cryptographic module as entries in the non-volatile memory, and
 time-stamp each of the entries.

18. The cryptographic module of claim 17, wherein the processor is further configured to:

digitally sign each of the entries in the non-volatile memory with a key associated with the cryptographic module.

19. The cryptographic module of claim 18, wherein the processor is further configured to:

output an indicator when a predetermined portion of the non-volatile memory is full.

20. The cryptographic module of claim 17, wherein the processor is further configured to:

prohibit execution of auditable operations when the non-volatile memory is full.

21. A cryptographic module, comprising:

means for storing a plurality of templates, each template including syntactic constraints associated with at least one authority;

means for receiving an input representing a request for authentication services, the input comprising at least one of a cryptographically protected certificate, certificate request, certificate revocation list and revocation request from a first registration authority;

means for identifying a template associated with the first registration authority;

means for comparing the syntax of the input to syntactic constraints defined in the template;

means for determining whether the syntax of the input is consistent with the template; and means for validating the input when the syntax is consistent with the template.

22. A computer-readable medium having stored thereon a plurality of sequences of instructions, said instructions including sequences of instructions which, when executed by a processor, cause said processor to perform the steps of:

receiving an input representing a request for authentication services, the input comprising at least one of a cryptographically protected certificate or a cryptographically protected certificate request from a first registration authority;

identifying a first template from a plurality of templates, each template including syntactic constraints associated with at least one authority and wherein the first template is associated with the first registration authority;

comparing the syntax of the input to syntactic constraints defined in the first template;

determining whether the syntax of the input is consistent with the first template; and validating the input when the syntax is consistent with the first template.

23. The computer-readable medium of claim 22, including instructions for causing said processor to perform the further step of:

digitally signing the input when the syntax is consistent with the first template.

24. The computer-readable medium of claim 22, wherein the input comprises a cryptographically protected certificate from the first registration authority, the computer-readable medium further including instructions for causing said processor to perform the step of:

determining whether the input came from the first registration authority by using a public key associated with the first registration authority.

25. The computer-readable medium of claim 22, wherein the input comprises an X.509 public key certificate including at least one certificate extension, the computer-readable medium further including instructions for causing said processor to perform the step of:

determining whether the syntax of the at least one certificate extension is consistent with the syntactic constraints defined for the extension in the first template.

26. The computer-readable medium of claim 22, further including instructions for causing said processor to perform the steps of:

storing operations performed by the processor as a set of entries in a non-volatile memory;

time-stamping each of the entries; and digitally signing the set of entries in the non-volatile memory with a key associated with the processor prior to outputting the entries.

27. The computer-readable medium of claim 26, further including instructions for causing said processor to perform the steps of:

outputting an indicator when a predetermined portion of the non-volatile is full; and prohibiting validation of inputs when the non-volatile memory is full.

28. A cryptographic module, comprising:

a memory configured to store a plurality of templates, each template including syntactic constraints associated with at least one authority; and a processor configured to:
      receive an input representing a public key certificate,
      compare the syntax of the certificate to syntactic constraints defined in one of the templates, and
      determine whether the syntax of the certificate is consistent with the template.

29. The cryptographic module of claim 28, wherein the processor is further configured to validate the certificate when the syntax is consistent with the template.

30. The cryptographic module of claim 28, wherein the processor is further configured to:
   modify the input to make it consistent with the template, and
   digitally sign the modified input.

31. The cryptographic module of claim 28, wherein the public key certificate includes at least one extension, the processor being further configured to:
   determine whether the syntax of the extension is consistent with the syntactic constraints defined for the extension in the template.

32. A cryptographic module, comprising:
   a memory configured to store a plurality of templates, each template including syntactic constraints associated with at least one authority; and
   a processor configured to:
      receive an input representing a certificate revocation list (CRL),
      compare the syntax of the CRL to syntactic constraints defined in one of the templates, and
      determine whether the syntax of the CRL is consistent with the template.

33. The cryptographic module of claim 32, wherein the processor is further configured to validate the CRL when the syntax is consistent with the template.

34. The cryptographic module of claim 32, wherein the processor is further configured to:
   modify the input to make it consistent with the template, and
   digitally sign the modified input.

35. The cryptographic module of claim 32, wherein the CRL includes at least one extension, the processor being further configured to:
   determine whether the syntax of the extension is consistent with the syntactic constraints defined for the extension in the template.

36. A cryptographic module, comprising:
   a memory configured to store a plurality of templates, each template including syntactic constraints associated with at least one authority; and
   a processor configured to:
      receive an input representing an attribute certificate,
      compare the syntax of the attribute certificate to syntactic constraints defined in one of the templates, and
      determine whether the syntax of the certificate is consistent with the template.

37. The cryptographic module of claim 36, wherein the processor is further configured to validate the attribute certificate when the syntax is consistent with the template.

38. The cryptographic module of claim 36, wherein the processor is further configured to:
   modify the input to make it consistent with the template, and
   digitally sign the modified input.

39. The cryptographic module of claim 36, wherein the attribute certificate includes at least one extension, the processor being further configured to:
   determine whether the syntax of the extension is consistent with the syntactic constraints defined for the extension in the template.

40. A method for storing at least one template for use with at least one authority, comprising:
   receiving information representing a template, the template defining syntactic constraints associated with the at least one authority;
   transmitting the template to an authenticating entity;
   verifying, by the authenticating entity, that the template was prepared by an authorized entity;
   digitally signing the template when the template was prepared by an authorized entity; and
   storing the template.

41. In a cryptographic device storing a plurality of templates with each template expressing constraints associated with at least one authority, a method for validating an input, comprising:
   receiving an input;
   comparing the input to constraints defined in one of the templates;
   determining whether the input is consistent with the template;
   validating the input when the input is consistent with the template; and
   digitally signing the input when the input is consistent with the template.

42. The method of claim 41, wherein the input represents an electronic check and the determining includes:

determining whether a value representing a monetary value associated with the electronic check is consistent with the template.

43. A method for validating input syntax from one of a plurality of authorities, comprising:

providing a cryptographic device, the cryptographic device having a plurality of templates expressing syntactic constraints, each template associated with at least one certification authority, attribute authority, registration authority or certificate revocation authority;

providing an input, the input representing a request for at least a portion of an authentication service; and comparing syntax of the input to the syntactic constraints defined in one of the templates to validate input syntax.

44. In a cryptographic device storing a plurality of templates expressing syntactic constraints associated with a plurality of sources, a method for checking input syntax, comprising:

receiving an input representing a request for at least a portion of an authentication service, each template associated with at least one authority; and comparing syntax of the input to the syntactic constraints defined in one of the templates.

* * * * *